(12) United States Patent
Yocca et al.

(10) Patent No.: US 12,054,604 B2
(45) Date of Patent: *Aug. 6, 2024

(54) ONE-PACK POLYMER MODIFIERS

(71) Applicant: Arkema France, Colombes (FR)

(72) Inventors: Kevin R. Yocca, King of Prussia, PA (US); Amy A. Lefebvre, King of Prussia, PA (US); Jason M. Lyons, King of Prussia, PA (US)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,644

(22) Filed: Aug. 17, 2022

(65) Prior Publication Data

US 2022/0389207 A1    Dec. 8, 2022

Related U.S. Application Data

(63) Continuation of application No. 16/650,397, filed as application No. PCT/US2018/052624 on Sep. 25, 2018, now abandoned.

(60) Provisional application No. 62/563,841, filed on Sep. 27, 2017.

(51) Int. Cl.
| | |
|---|---|
| *C08L 27/06* | (2006.01) |
| *C08F 220/14* | (2006.01) |
| *C08F 220/18* | (2006.01) |
| *C08F 222/10* | (2006.01) |
| *C08K 3/013* | (2018.01) |

(52) U.S. Cl.
CPC ............ *C08L 27/06* (2013.01); *C08F 220/14* (2013.01); *C08F 220/1804* (2020.02); *C08F 222/102* (2020.02); *C08K 3/013* (2018.01); *C08L 2205/03* (2013.01); *C08L 2207/53* (2013.01)

(58) Field of Classification Search
CPC .. C08L 27/06; C08L 2205/03; C08L 2207/53; C08L 51/003; C08F 220/06; C08F 220/14; C08F 220/1804; C08F 220/325; C08F 222/38; C08F 265/06

See application file for complete search history.

(56) References Cited

U.S. PATENT DOCUMENTS

| | | | |
|---|---|---|---|
| 3,301,919 A | 1/1967 | Cenci et al. | |
| 4,696,973 A * | 9/1987 | Kamata | C08L 101/00 |
| | | | 525/85 |
| 6,639,012 B2 | 10/2003 | Wills et al. | |
| 7,457,739 B2 | 11/2008 | Agarwala et al. | |
| 7,557,158 B2 | 7/2009 | Rheenen | |
| 7,989,082 B2 | 8/2011 | Rheenen | |
| 8,420,445 B2 | 4/2013 | Leib | |
| 8,722,750 B2 | 5/2014 | Van Rheenen et al. | |
| 9,085,679 B2 | 7/2015 | Rachwal | |
| 9,988,524 B2 | 6/2018 | Rachwal | |
| 11,220,596 B2 * | 1/2022 | Yocca | C08L 27/06 |
| 2003/0008959 A1 | 1/2003 | Crabb et al. | |
| 2007/0287782 A1 | 12/2007 | Frenkel et al. | |
| 2009/0093560 A1 | 4/2009 | Van Rheenen et al. | |
| 2009/0191400 A1 | 7/2009 | Vanrheenen | C08L 51/04 |
| | | | 428/319.7 |
| 2010/0143629 A1 | 6/2010 | Delprat et al. | |
| 2010/0283127 A1 | 11/2010 | Leib | |
| 2012/0208963 A1 | 8/2012 | Van Rheenen et al. | |
| 2017/0033079 A1 | 2/2017 | Lin et al. | |
| 2017/0037235 A1 | 2/2017 | Lyons et al. | |
| 2017/0335097 A1 | 11/2017 | Takamizu | C08L 51/04 |
| 2019/0055389 A1 * | 2/2019 | Yocca | C08L 63/00 |

FOREIGN PATENT DOCUMENTS

| | | | |
|---|---|---|---|
| JP | WO 2016068239 A1 | 5/2016 | |
| KR | 20020085815 A | 11/2002 | |
| KR | 101030513 B1 | 4/2011 | |
| KR | 101030513 B1 | 4/2011 | |
| WO | WO 2017/165582 A1 | 9/2017 | |

OTHER PUBLICATIONS

KR 20020085815 A machine translaiton (Nov. 2002).

* cited by examiner

*Primary Examiner* — Ana L. Woodward
(74) *Attorney, Agent, or Firm* — Boone IP Law

(57) ABSTRACT

A one-pack polymer modifier containing a) at least one process aid functionalized with a reactive epoxy, hydroxyl, β-keto ester, β-keto amide or carboxylic acid functional group, b) at least one impact modifier, c) optionally, at least one mineral filler and d) optionally, at least one further additive is useful for modifying the properties of thermoplastic polymers such as PVC, including reducing the surface gloss of an article prepared from the thermoplastic polymer and improving the impact strength of such an article.

19 Claims, No Drawings

ONE-PACK POLYMER MODIFIERS

CROSS-REFERENCES TO RELATED APPLICATIONS

This is a continuation of U.S. patent Ser. No. 16/650,397, filed Mar. 25, 2020, which is a 371 of PCT/US2018/052624, filed Sep. 25, 2018, which claims benefit of U.S. Ser. No. 62/563,841, filed Sep. 27, 2017. The entire disclosure of each of the aforementioned applications is incorporated herein by reference for all purposes.

FIELD OF THE INVENTION

This disclosure relates generally to one-pack polymer modifiers useful in polyvinyl chloride (PVC) formulations as well as in alloys with PVC. More specifically, the present disclosure relates to one-pack polymer modifiers that are capable of both reducing the specular gloss of PVC and PVC alloys and improving their impact properties.

BACKGROUND OF THE INVENTION

Polyvinyl chloride (PVC) resins are generally chemically inert, resistant to water and environmental corrosion, provide good electrical and thermal insulation, and can maintain performance over a large temperature range. The commercial polymerization processes and post-polymerization processing techniques (e.g., extrusion, injection molding, blow molding, etc.) used with polyvinyl chloride (PVC) or "vinyl", as it is commonly called, have matured over the past century. This manufacturing base along with the basic properties exhibited by PVC has led to a proliferation of PVC-containing products. For example, within the decade, the sale of vinyl windows has surpassed the sale of both wood and aluminum-based windows. Vinyl products are durable, recyclable, and easily maintained. They are resistant to fungus and mildew growth and are not affected by rot, corrosion, cracking, flaking, or insect infestation. Vinyl products exhibit excellent fire resistance properties, which meet most building codes for ignitability, flammability, heat released, burning rate, flame spread, and smoke generation. Since vinyl products typically are the same color throughout, minor scratches do not require painting or repair, and the aesthetics are easily maintained by washing with soap and water. When properly installed and maintained, vinyl products provide long lasting aesthetics, reliable performance, and continued energy savings.

The dispersion of pigments into the PVC formulation can be used to provide color, while the incorporation of matting agents into the formulation can modify the surface gloss exhibited by a final PVC product. Matting agents typically fall within three areas: i) a polymer core/shell impact modifier having a core of poly(butyl acrylate) and a shell of poly(methyl acrylate), such as Paraloid™ (the Dow Chemical Company, Midland, MI); ii) a cross-linked poly(methyl methacrylate) particle having an average size of several microns, such as Techpolymer® MBX K-8 (Sekisui Plastics Co. Ltd., Tokyo, Japan) or Altuglas® BS 100 particles (Arkema Inc., King of Prussia, PA); and iii) polymers such as methyl methacrylate/styrene copolymers, such as Acematt® OP 278 (Evonik Industries, Essen, Germany). However, many matting agent technologies for PVC and other thermoplastic polymers and resins either may not provide a substantial decrease in surface gloss or they may negatively affect other mechanical properties associated with the formed PVC component.

PVC does not only need to be used by itself as the base resin in a formulation, PVC can also be blended with other thermoplastic resins, like acrylics, including polymethyl methacrylate, acrylonitrile styrene acrylate copolymers, polycarbonate, acrylonitrile butadiene styrene copolymers, and polyvinylidene difluoride to form an alloy. These alloys can then be formulated with various additives including pigments and matting agents to achieve the desired appearance in a similar fashion as a PVC formulation. These alloys can also be used in a similar capacity as PVC resins using similar post-polymerization processes to yield the final articles.

U.S. Pat. No. 7,557,158 discloses thermoplastic polymer compositions that can be processed into capstocks having a reduced gloss appearance, high impact strength, and superior weatherability, U.S. Pat. No. 3,301,919 discloses process aids for polyvinyl chloride that comprise substantially linear copolymers obtained by polymerizing a mixture of 20-98.5 percent by weight methyl methacrylate, 0.5-40 percent by weight of ethyl acrylate and 1-40 percent by weight of glycidyl methacrylate, such that the oxirane ring is intact in at least 85 percent of the glycidyl methacrylate units. U.S. Pub. 2017/33079 discloses particles for vinyl chloride resin modification, each of which contains a glycidyl group-containing polymer and a core-shell copolymer.

Korean Patent No. 101030513 discloses a method for manufacturing a methacrylate copolymer used as a process aid for a vinyl chloride resin. The method comprises the steps of: polymerizing a monomer mixture in the presence of a water-soluble initiator and an emulsifier to prepare a polymer latex; and solidifying the polymer latex. The monomer mixture comprises 60-85 weight percent of methyl methacrylate, 15-30 weight percent of an alkyl acrylate-based compound and 1-10 weight percent of an epoxide-based compound.

SUMMARY OF THE INVENTION

The present invention provides a one-pack polymer modifier useful for modifying certain properties of polyvinyl chloride (PVC) and PVC alloys, wherein the one-pack polymer modifier comprises, consists essentially of or consists of a) at least one functionalized process aid functionalized with at least one reactive functional group selected from the group consisting of epoxy functional groups, hydroxyl functional groups, β-keto ester functional groups, β-keto amide functional groups and carboxylic acid functional groups; b) at least one impact modifier; c) optionally, at least one mineral filler; and d) optionally, at least one further additive, wherein the one-pack polymer modifier is in the form of a plurality of individual particles and at least a portion of the individual particles contain both the at least one functionalized process aid and the at least one impact modifier. When a mineral filler is present, the impact modifier(s), functionalized process aid(s) and mineral filler(s) may be in intimate contact. As used herein, the term "intimate contact" means that the mineral filler is blended into (or with) the process aid and impact modifier, instead of coating the surfaces of the process aid and impact modifier. The one-pack polymer modifier may take the form of a dry powder. Particles of functionalized process aid and particles of impact modifier may be agglomerated or aggregated into larger particles containing both functionalized process aid and impact modifier, for example. As used herein, the term "one-pack" means a system in which a plurality of additives (e.g., functionalized process aid(s) and impact modifier(s), or functionalized process aid(s), impact modifier(s) and mineral filler(s)) are combined in a single package or container, such that the additives may conveniently be simultaneously dispensed and combined with polyvinyl chloride or a PVC alloy to provide a formulated PVC based compound, thereby eliminating the need to add such additives separately.

The present invention also generally provides polyvinyl chloride (PVC) and its alloys with reduced surface gloss and enhanced impact properties. The formulated PVC or PVC based alloys (sometimes also referred to herein as a "PVC compound") comprises, consists essentially of or consists of: PVC or a PVC alloy and a one-pack polymer modifier comprised of, consisting essentially of or consisting of one or more functionalized process aids and one or more impact modifiers, possibly also in combination with one or more mineral fillers and/or one or more other additives. The one-pack polymer modifier is in the form of a plurality of individual particles and at least a portion of the individual particles contain both the at least one functionalized process aid and the at least one impact modifier, as well as possibly also at least one mineral filler and/or one or more other additives. A component made of the PVC compound may exhibit gloss reduction of at least 5 points measured at an angle of 85 degrees or less when compared to a similar component in which none of the process aids are functionalized. A component made of the PVC compound, perhaps in combination with one or more additional materials, may be used in an automotive product, a building material, a household or kitchen item, a medical or office supply product, an electronic product, apparel, or packaging for personal care or other consumer products.

Process aids useful in the one-pack polymer modifier of the present invention include at least one functionalized process aid, although combinations of at least one functionalized process aid and at least one non-functionalized process aid may also be employed. A functionalized process aid is defined herein as a polymer functionalized with epoxy, hydroxyl, β-keto ester, β-keto amide and/or carboxylic acid functional groups. The process aids used in the one-pack polymer modifier thus may comprise at least one polymer functionalized with about 0.5 wt. % to about 35 wt. % of a reactive epoxy, hydroxyl, β-keto ester, β-keto amide or carboxylic acid functional group based on the total weight of the process aids. The process aids may be present at levels of about 0.1 to about 12 phr in PVC compounds. When desirable, the process aids may be functionalized with at least 1 wt. % of the reactive functional group(s) based on the total weight of the process aids. The reactive epoxy, hydroxyl, β-keto ester, β-keto amide or carboxylic acid functional groups in the process aids may be derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; β-keto esters of (meth)acrylic acids (e.g., (meth)acrylic acid acetoacetoxyalkyl esters); β-keto amides of (meth)acrylic acids (e.g., (meth)acrylic acid acetoacetoxyalkyl amides); epoxy group-containing monomers; or a mixture thereof.

The process aid component of the one-pack polymer modifier of the present invention may be comprised solely of functionalized process aid(s) or may comprise both functionalized process aid(s) and non-functionalized process aid(s). For example, the process aid component may, in various embodiments of the invention, comprise 1 to 100% by weight functionalized process aid and 0 to 99% by weight non-functionalized process aid, 10 to 100% by weight functionalized process aid and 0 to 90% by weight non-functionalized process aid, 25 to 100% by weight functionalized process aid and 0 to 75% by weight non-functionalized process aid, 50 to 100% by weight functionalized process aid and 0 to 50% by weight non-functionalized process aid, or 75 to 100% by weight functionalized process aid and 0 to 25% by weight non-functionalized process aid.

According to one aspect of the present disclosure, the PVC or PVC alloy component may exhibit a gloss reduction of at least 10 points when measured at an angle of 60 degrees or less. In addition, the PVC or PVC alloy component that contains the functionalized process aids and the similar PVC or PVC alloy component that contains only non-functionalized process aids (but no functionalized process aid) may exhibit a comparable impact property. This impact property may be, without limitation, Izod impact or drop dart impact.

According to another aspect of the present disclosure, the process aids may exhibit an average molecular weight or weight average molar mass ($M_w$) that is ~50,000 g/mol or higher. The base polymer in the process aids may comprise an acrylic polymer or copolymer. This acrylic polymer or copolymer can be derived from vinyl- or (meth)acrylic-containing monomers; styrene or styrene derivatives; olefins; dienes; or mixtures thereof, provided that the monomers predominantly comprise (meth)acrylic-containing monomers. The process aids may also comprise between 0 to about 1 wt. % of a chain transfer or cross-linking agent.

A method of reducing the surface gloss and improving the impact properties of a PVC or PVC alloy component in accordance with the present invention comprises: providing a base PVC polymer or PVC alloy; providing a one-pack polymer modifier comprised of, consisting essentially of or consisting of at least one functionalized process aid (possibly in combination with at least one non-functionalized process aid), at least one impact modifier, optionally at least one mineral filler and optionally at least one further additive; producing a formulation from the base PVC polymer or the PVC alloy and the one-pack polymer modifier; and forming the PVC or PVC alloy component from the formulation. Such method may additionally comprise the following steps for preparing the functionalized process aid: forming at least one base polymer; and functionalizing the at least one base polymer to form a functionalized process aid. The base polymer of the process aid may be functionalized with about 0.5 wt. % to about 35 wt. % of a reactive epoxy, hydroxyl, β-keto ester, β-keto amide or carboxylic acid functional group based on the total weight of the process aid. The functionalized process aid may also be prepared by a method comprising a step of polymerizing at least one functionalized monomer comprised of at least one functional group selected from the group consisting of hydroxyl functional groups, epoxy functional groups, β-keto ester functional groups, β-keto amide functional groups and carboxylic acid functional groups, optionally together with one or more non-functionalized monomers. The functionalized process aid may also be prepared by a method comprising polymerizing at least one monomer comprised of at least one functional group that is a precursor to a functional group selected from the group consisting of hydroxyl functional groups, epoxy functional groups, β-keto ester functional groups, β-keto amide functional groups and carboxylic acid functional groups to obtain a polymeric process aid precursor comprising the at least one functional group that is a precursor to a functional group selected from the group consisting of hydroxyl functional groups, epoxy functional groups, β-keto ester functional groups, β-keto amide functional groups and carboxylic acid functional groups and converting at least a portion of the at least one functional group that is a precursor to a functional group selected from the group consisting of hydroxyl functional groups, epoxy functional groups, β-keto ester functional groups, β-keto amide functional groups and carboxylic acid functional groups in the polymeric process aid precursor to at least one functional group selected from the group consisting of hydroxyl functional groups, epoxy functional groups, β-keto ester functional groups, β-keto amide functional groups and carboxylic acid functional groups to obtain a functionalized process aid. The method may also comprise the following step for preparing the one-pack polymer modifier: combining the at least one functionalized process aid (possibly in combination with at least one non-functionalized process aid), the at least one impact modifier, optionally the at least one mineral filler and optionally the at least one further additive (different possible ways of combining these components of the one-pack polymer modifier are described elsewhere herein).

The resulting PVC or PVC alloy component may exhibit a gloss reduction of at least 5 points measured at an angle of 85 degrees or less when compared to a similar PVC or PVC alloy component in which the process aids are not functionalized. Alternatively, the PVC or PVC alloy component may exhibit a gloss reduction of at least 10 points when measured at an angle of 60 degrees or less. The PVC or PVC alloy component that contains the functionalized process aids and the similar PVC component containing only non-functionalized process aids (but the same type and amount of impact modifier(s)) may also exhibit a comparable impact property. This impact property may be without limitation measured as Izod impact or drop dart impact.

The gloss reducing method may further include the process aids being present in about 0.1 to about 12 phr in PVC or PVC alloy formulations. When desirable, the process aids may be functionalized with at least 1 wt. % of the reactive functional group(s) based on the total weight of the process aids. The reactive epoxy, hydroxyl, β-keto ester, β-keto amide or carboxylic acid functional group of the process aids may be derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; (3-keto esters and β-keto amides of (meth)acrylic acids; epoxy group-containing monomers; or a mixture thereof. The base polymer of the process aids may be comprised of an acrylic polymer or copolymer. This acrylic polymer or copolymer can be derived from (meth)acrylic-containing monomers, optionally in combination with vinyl-containing monomers; styrene or styrene derivatives (vinyl aromatic monomers); olefins; dienes; or mixtures thereof. The functionalized process aids may have a weight average molecular weight ($M_w$) that is ~50,000 g/mol or higher.

Further areas of applicability will become apparent from the description provided herein. It should be understood that the description and specific examples are intended for purposes of illustration only and are not intended to limit the scope of the present disclosure.

DETAILED DESCRIPTION OF THE INVENTION

Impact Modifier

The one-pack polymer modifiers of the present invention include at least one impact modifier. Impact modifiers enhance the toughness and the resistance of the final PVC-containing product towards cracking or shattering during any subsequent manufacturing operations that are performed on the PVC or PVC alloy component, such as cutting or punching holes in the profile of the component or during its use in its final application. The impact modifiers may include any compatible polymeric particles, including block copolymers, and "core-shell particulate" polymers having a soft rubbery core (Tg<0 degrees C.) or hard core (Tg>0 degrees C.) with limited compatibility with the PVC resin or other thermoplastic polymer and a grafted, compatible, outer polymeric shell. The core-shell particulate polymers may have a core surrounded by more than one shell. The polymeric particles or core-shell particulate polymers may comprise methacrylate/butadiene/styrene (MBS), acrylic polymers (e.g., known as acrylic impact modifiers [AIM]), or acrylate/butadiene/methacrylate, and acrylonitrile/butadiene/styrene (ABS); semi-compatible polymers, such as polymers of chlorinated polyethylene (CPE) and ethylene-vinyl acetate (EVA); and other polymers, such as terpolymers of ethylene/vinyl acetate/carbon monoxide, ethylene/propylene/carbon monoxide, polymers of olefins with acrylates, various copolymers of butadiene with acrylonitrile, methacrylates or other rubbers, and even polysiloxane enhanced materials. Preferred shells comprise polymethylmethacrylate (PMMA) homopolymers or copolymers, comprised of two or more monomers, one of which may be methyl methacrylate. In certain embodiments, the impact modifier is a core-shell particulate polymer having a rubber core representing from 70 to 95 weight % of the core-shell particulate polymer and a shell representing the balance of the core-shell particulate polymer (i.e., the shell is from 5 to 30 weight % of the core-shell particulate polymer), the rubber core having a glass transition temperature less than 50 degrees C. According to other aspects of the invention, the impact modifier may have a rubber content of from 60 to 95% by weight or from 70 to 92% by weight, the balance to 100% being a non-rubbery component.

According to certain embodiments of the invention, the impact modifier(s) may be in particulate form, having for example an average particle size of from 70 nm to 5 microns depending upon the type of impact modifier and the type of thermoplastic polymer. Where the thermoplastic polymer to be modified by the one-pack polymer modifier is a thermoplastic polymer other than PVC, the average particle size of the impact modifier may be from 250 nm to 5 microns, for example. Where the thermoplastic polymer to be modified by the one-pack polymer modifier is PVC, the average particle size of the impact modifier may be from 80 nm to 350 nm, for example.

Process Aid

The one-pack polymer modifiers of the present invention contain one or more functionalized process aids, but in certain embodiments may additionally contain one or more non-functionalized process aids. According to one aspect of the present disclosure, functionalized process aids that are synthesized for polyvinyl chloride or PVC alloys processing and modified with functional groups as described above and further defined herein achieve differentiating effects in the polyvinyl chloride or PVC alloys matrix as compared to conventional acrylic process aids. The functionalized process aids comprise acrylic polymers or copolymers synthesized with reactive epoxy, hydroxyl, β-keto ester, β-keto amide and/or carboxylic acid functional groups, which are capable of reacting during the process that is used to form the PVC or PVC alloy component. An example of a method capable of forming the PVC or PVC alloy component includes, without limitation, an extrusion or calendaring process. During the extrusion or calendaring process, the reactive functional groups may facilitate the occurrence of crosslinking with or without the presence of an optional chain extender or crosslinking agent. When desirable, the crosslinking during extrusion or calendaring may occur between particles that are formed by the process aids (e.g., crosslinking between process aid to process aid and/or crosslinking between process aid and PVC resin). Conventional process aids used in polyvinyl chloride (PVC) and PVC alloys formulations are typically comprised of acrylate and methacrylate monomers, which are not reactive during such processing. The functionalized process aids of the present disclosure may be made according to any method known in the art, including, but not limited to, solution, emulsion, suspension, and bulk polymerization.

The functionalized process aids suitable for use in the present invention may be "acrylic" polymers (including copolymers) with a variety of different compositions and molecular weights. "Acrylic polymers" as used herein refers to polymers having 60 mole percent or more of (meth) acrylic monomer units. The terms "(meth)acrylic" and "(meth)acrylate" are used herein to include both acrylic and methacrylic (in the case of "(meth)acrylic") or both acrylate and methacrylate (in the case of "(meth)acrylate"). Where the functionalized process aid is a copolymer, in certain embodiments only a portion of the monomer units are functionalized with one or more of the above-mentioned functional groups. The copolymers could be random, block, gradient or of other architectures.

The functionalized process aid may be higher in molecular weight than the PVC resin or resins the PVC is alloyed with that the one-pack polymer modifiers containing the process aids will be used to modify. In PVC resin specifically, because the process aids are very compatible with the PVC resin, they assist with inter-particle mixing of the PVC particles at the beginning stages of fusion and gelation. The soluble fraction of the process aids of the present disclosure may have a weight average molecular weight (also called molar mass ($M_w$)) that is greater than about 50,000 g/mol; alternatively, the weight average molecular weight of the soluble fraction of process aids is greater than about 100,000 g/mol; alternatively, the molecular weight ($M_w$) of the soluble fraction of the process aids is about 250,000 g/mol or greater; alternatively, the ($M_w$) soluble fraction of the process aids is between about 50,000 g/mol to about 15 million g/mol, alternatively between about 750,000 g/mol to about 12 million g/mol. The molecular weight may be measured by any known method including but not limited to gel permeation chromatography (GPC), the procedure of which is further described in the Examples. The upper end of the molecular weight measurement may be affected by the occurrence of crosslinking between polymeric process aids.

In one embodiment, the process aids employed in the invention surprisingly exhibit partial insolubility in organic solvents. The soluble and insoluble fractions of the process aids may be determined through the use of an extraction technique (see the Examples) with a solvent, such as acetone, tetrahydrofuran (THF), or methyl ethyl ketone (MEK). The insoluble fraction of the process aids may range from 1% to about 90%, for example, alternatively, the insoluble fraction ranges from about 5% to about 90%; alternatively, the insoluble fraction ranges from about 10% to about 90%, preferably from about 15 to 90%, more preferably about 45 to 90%, even more preferably about 55 to 90%.

The process aids exhibit a glass transition temperature ($T_g$) that is greater than or equal to 0° C. and up to about 150° C.; alternatively, the $T_g$ of the process aids is within the range of about 60° C. to about 100° C. or within the range of about 60° C. to about 85° C. The $T_g$ of the process aids can be measured either as powders or pressed bars formed from said powders using any known method, including but not limited to analysis by differential scanning calorimetry (DSC) as further described in the Examples.

The process aids comprise a functionalized polymer (as used herein, the term "polymer" includes copolymer) derived from one or more ethylenically unsaturated monomers, including without limitation, vinyl- and (meth)acrylic-containing monomers, such as linear or branched alkyl esters of acrylic or methacrylic acid; styrene and styrene derivatives (vinyl aromatic monomers); olefins, such as ethylene; dienes, such as butadiene; and mixtures thereof, with linear or branched alkyl esters of acrylic or methacrylic acid being preferred. The functionalized polymer contains one or more functional groups selected from epoxy functional groups, hydroxyl functional groups, β-keto ester functional groups, β-keto amide functional groups, carboxylic acid functional groups and combinations of two or more such functional groups. These functional groups may be introduced into the polymer by utilizing at least one monomer containing such a functional group or at least one monomer containing a precursor to such a functional group (i.e., a moiety capable of being converted into the functional group after formation of the polymer). Several specific examples of (meth)acrylic-containing monomers, include, but are not limited to, methyl(meth)acrylate, ethyl(meth) acrylate, n-butyl(meth)acrylate (BMA), 2-ethylhexyl(meth) acrylate, glycidyl(meth)acrylate, and mixtures thereof, with methyl(meth)acrylate, ethyl(meth)acrylate, and glycidyl (meth)acrylate being preferred (wherein the glycidyl(meth) acrylate may be used to introduce epoxy or hydroxyl functionality into the process aid). The functionalized process aid may preferably comprise methyl methacrylate in polymerized form for compatibility with a PVC matrix. When desirable, other acrylates, such as butyl acrylate or ethyl acrylate, can be added as co-monomers at a level of 10-30 wt. % to control the glass transition temperature ($T_g$) and fusion properties of the functionalized process aid.

In addition to the at least one functionalized process aid, the one-pack polymer modifiers of the present invention may comprise one or more non-functionalized process aids (i.e., polymers that do not contain reactive epoxy, hydroxyl, β-keto ester, β-keto amide or carboxylic acid functional groups). Any of the non-functionalized process aids known in the art may be utilized. Suitable non-functionalized process aids may be prepared by polymerization of any of the above-mentioned monomers, subject to the provisos that the monomers do not include any monomers containing reactive functional groups selected from reactive epoxy, hydroxyl, β-keto ester, β-keto amide or carboxylic acid functional groups and that the polymers have not been reacted post-polymerization to introduce such functional groups. For example, the non-functionalized process aid may be poly (methyl methacrylate), poly(butyl acrylate), poly(ethyl acrylate), poly(methyl-methacrylate-butyl acrylate), poly (methyl methacrylate-butyl methacrylate), poly(methyl methacrylate-ethyl acrylate), poly(methyl methacrylate-butyl acrylate-ethyl acrylate), poly(methyl methacrylate-butyl methacrylate-butyl acrylate), poly(methyl methacrylate-butyl methacrylate-ethyl acrylate), poly(methyl methacrylate-styrene) copolymer, or a mixture thereof.

At least one of the process aids used in the one-pack polymer modifier may be functionalized with about 0.5 wt. % to about 35 wt. % of a reactive epoxy, hydroxyl, β-keto ester, β-keto amide and/or carboxylic acid functional group based on the total weight of the process aids. Alternatively, the loading of the reactive group functionalization is between about 1 wt. % and about 25 wt. %; alternatively, the one or more process aids includes at least between about 5 wt. % and about 20 wt. % of the reactive functional groups based on the weight of the total weight of the process aids. Not all of the process aids utilized in the one-pack polymer modifier need to be functionalized. In other words, a conventional process aid (PA) and a functionalized process aid (f-PA) may be utilized in combination. The ratio of PA to f-PA may range from 0:100 to about 75:25; alternatively, from about 0:100 to about 50:50; alternatively, from about 0:100 to about 25:75.

As previously mentioned, a portion of the functionalized process aid may be insoluble. Both the soluble and insoluble portions of the functionalized process aid may be functionalized with reactive epoxy, hydroxyl, β-keto ester, β-keto amide and/or carboxylic acid functional groups. Accordingly, one-pack polymer modifiers in various embodiments of the present invention may contain the following combinations of components:
 a). Impact modifier(s)+functionalized insoluble process aid(s)+functionalized soluble process aid(s);
 b). Impact modifier(s)+functionalized insoluble process aid(s)+functionalized soluble process aid(s)+non-functionalized soluble process aid(s);
 c). Impact modifier(s)+functionalized soluble process aid(s);
 d). Impact modifier(s)+functionalized soluble process aid(s)+non-functionalized soluble process aid(s).

The reactive functional groups may be introduced into the functionalized process aid by copolymerization techniques. For example, one or more ethylenically unsaturated monomers bearing the desired reactive functional groups are copolymerized together with one or more ethylenically unsaturated monomers that are not so functionalized. The reactive functional groups may also be introduced through post-polymerization treatment of a base polymer. For example, hydroxyl groups may be formed by hydrolysis of a base polymer comprised of vinyl acetate monomer units. As another example, a base polymer containing sites of ethylenic unsaturation (e.g., in the polymer backbone and/or in side chains) may be epoxidized to provide an epoxy-functionalized process aid. The use of these techniques to prepare the functionalized process aid may yield a polymeric product that contains both functionalized polymer molecules and non-functionalized polymer molecules (i.e., not all of the polymer molecules present in the polymeric product may contain reactive functional groups).

The functionalized process aids of the present disclosure may be made according to any method known in the art, including, but not limited to, mass, solution, emulsion, suspension, inverse emulsion, and bulk polymerization. The process aids may be used in powder or particle form. The powder or particles may be solid particles that comprise a base polymer that is substantially functionalized with the reactive groups or they may be pseudo core-shell particles. The functionalized process aids (f-PA) may be prepared in a multi-step polymerization process such that the functionalized process aids resemble pseudo core-shell particles that comprise a core made of non-functionalized base polymer with at least part of said core being encapsulated with a shell that includes reactive epoxy, hydroxyl, β-keto ester, β-keto amide or carboxylic acid functional groups.

The reactive epoxy, hydroxyl, β-keto ester, β-keto amide or carboxylic acid groups may be derived from the use of epoxy-, hydroxyl-, β-keto ester-, β-keto amide- or carboxylic acid-containing monomers during a polymerization process to prepare the functionalized process aid. Examples of such monomers include, but are not limited to, hydroxyl-substituted alkyl esters of (meth)acrylic acid, such as 2-hydroxyethyl(meth)acrylate and hydroxypropyl(meth)acrylates; vinyl esters of linear or branched carboxylic acids, such as vinyl valerate or vinyl acetate (wherein the ester groups formed therefrom in the polymer are hydrolyzed to form hydroxyl groups); unsaturated carboxylic acids, including unsaturated $C_3$-$C_6$ monocarboxylic acids, such as acrylic acid (AA) and methacrylic acid and unsaturated $C_4$-$C_6$ dicarboxylic acids, such as maleic acid and itaconic acid; β-keto esters and amides of acrylic acid and methacrylic acid (e.g., (meth)acrylic acid acetoacetoxyalkyl esters and amides), such as acetacetoxyethyl(meth)acrylate (AAEM), acetoacetoxypropyl(meth)acrylate, acetoacetoxybutyl(meth)acrylate, 2,3-di(acetoacetoxy)propyl(meth)acrylate, acetoacetoxyethyl(meth)acrylamide, 2-cyanoacetoxyethyl(meth)acrylate, 2-cyanoacetoxyethyl(meth)acrylamide, N-cyanoacetyl-N-methylaminoethyl(meth)acrylate, and N-(2 propionylacetoxybutyl) (meth)acrylamide; and epoxy group-containing monomers, such as glycidyl acrylate or glycidyl methacrylate (GMA). Unsaturated $C_3$-$C_6$ monocarboxylic acids, such as acrylic acid (AA), and unsaturated $C_4$-$C_6$ dicarboxylic acids, such as maleic acid and itaconic acid; and epoxy group-containing monomers, such as glycidyl acrylate or glycidyl methacrylate (GMA) are preferred, with acrylic acid, glycidyl acrylate, and glycidyl methacrylate (GMA) being more preferred. Alternatively, the functional groups may be incorporated into the process aids through the addition of acrylic acid (AA), glycidyl methacrylate (GMA), which are most preferred, or a mixture thereof.

Mineral Filler

In certain embodiments of the invention, the one-pack polymer modifier is additionally comprised of at least one mineral filler. The mineral filler for use in the invention may be treated or non-treated, and includes, but is not limited to, ground natural calcium carbonate (GCC), precipitated calcium carbonate (PCC), nanosized PCC (NPCC), silica (including fumed or precipitated silica), clays, Montmorillonite (nano-clay), zeolites, perlite, talc, mica, calcium metasilicate or any other type of inorganic material that can be obtained either as a slurry or as a dry powder. The mineral filler can also be a mixture of two or more different mineral fillers, such as both calcium carbonate and silica.

For example, ultrafine $CaCO_3$ particles may be used as a filler to enhance low temperature impact resistance and increase UV stability in rigid PVC products. In certain embodiments of the invention precipitated or ground calcium carbonate having an average particle size of from 50 nm to 5 microns may be utilized. Synthetic amorphous silica particles may be incorporated into a PVC formulation to also enhance impact resistance and to provide improved flow properties.

Additional Additives

The one-pack polymer modifier may also optionally comprise one or more additives other than the functionalized process aids, impact modifiers and mineral fillers described above. Such additional optional additives include, for example, fillers other than mineral fillers, non-functionalized process aids (in particular, non-functionalized process aids which are acrylic/styrenic copolymers; in various embodiments of the invention, one or more non-functionalized process aids are present in the one-pack polymer modifier at levels of 0.1 to 15, 1 to 10 or 3 to 7% by weight of the one-pack polymer modifier), pigments, lubricants (internal and external), stabilizers (including heat stabilizers), antioxidants, flow aids or other desired additives. Such additives could also be combined with the PVC or PVC alloy separately from the one-pack polymer modifier to form the PVC or PVC alloy component.

Various pigments may be included to provide color to the PVC or PVC alloy. These pigments generally exhibit stability at elevated temperatures and to the presence of hydrogen chloride. These pigments may include without limitation various organic pigments or ceramic pigments, such as titanium dioxide and other metal oxides, with or without a silica or alumina surface treatment.

Various lubricants may be included in a PVC or PVC alloy formulation in relatively small amounts in order to reduce the resistance to flow of the polymer chains and other ingredients that are present. These lubricants may act as an external lubricant or metal release (slip) agent that enhances the flow of the "hot" material through the processing equipment or as an internal lubricant that reduces the melt viscosity of the material being processed. In a PVC formulation, lubricants are the main additional component that may be added to help facilitate or drive the fusion of the PVC resin. Several examples of lubricants include without limitation, paraffin waxes and long chain carboxylic acids or their esters, amides, and salts. The amount of lubricant utilized is typically below the level that will cause the occurrence of "plate out". Plate out occurs when the lubricants present in the formulation are squeezed out of the hot bulk material as the extrudate is leaving the die or going through a vacuum calibrator, thereby either causing a plug or deposit of material to occur.

Various stabilizers may be included in a PVC or PVC alloy formulation to enhance resistance to heat or UV light, to name a few. The heat stabilizers may include, but not be limited to, lead-based or organotin compounds, mixed metal stabilizers, or organic stabilizers, such as epoxides. The UV stabilizers may include, without limitation, hindered amines or phenols.

Exemplary Amounts of Components of One-Pack Polymer Modifier

One-pack polymer modifiers in accordance with the present invention generally may comprise, consist essentially of or consist of 1 to 50 weight % process aid and 99 to 50 weight % impact modifier, based on the total weight of process aid and impact modifier. In other embodiments, one-pack polymer modifiers in accordance with the present invention generally may comprise, consist essentially of or consist of 5 to 40 weight % process aid and 95 to 70 weight % impact modifier, based on the total weight of process aid and impact modifier. In still other embodiments, one-pack polymer modifiers in accordance with the present invention generally may comprise, consist essentially of or consist of 10 to 25 weight % process aid and 90 to 75 weight % impact modifier, based on the total weight of process aid and impact modifier.

Where one or more mineral fillers are additionally present, one-pack polymer modifiers in accordance with the present invention generally may comprise, consist essentially of or consist of 1 to 50 weight % process aid, 99 to 50 weight % impact modifier, and 0.01 to 15 weight % mineral filler, based on the total weight of process aid, impact modifier and mineral filler. For example, precipitated calcium carbonate may be present at levels of 0.1 to 15 weight %, 1 to 10 weight % or 3 to 7 weight %, based on the total weight of process aid, impact modifier and mineral filler, in various embodiments of the invention. Silica may be present at levels of 0.01 to 1 weight %, 0.05 to 0.7 weight % or 0.1 to 0.5 weight %, based on the total weight of process aid, impact modifier and mineral filler, in other embodiments of the invention.

Methods of Making One-Pack Polymer Modifiers

According to certain embodiments of the invention, the one-pack polymer modifier is in the form of a powder, in particular a dry powder.

The one-pack polymer modifiers of the present invention may be prepared using several different methods. However, the method selected should be one which is effective to result in a one-pack polymer modifier which is in the form of a plurality of individual particles, wherein at least a portion of the individual particles contain both the at least one process aid and the at least one impact modifier. In one embodiment, for instance, at least some of the individual particles are aggregates or agglomerates of smaller particles of process aid and particles of impact modifier. In other embodiments, the process aid(s) and impact modifier(s) may be admixed or blended, at least in part, on a molecular level.

For example, a suitable method comprises the following steps: a) blending one or more functionalized process aids (possibly also one or more non-functionalized process aids) with one or more impact modifiers (optionally also one or more mineral fillers and/or one or more further additives), wherein at least one of the functionalized process aids, impact modifiers, mineral fillers (if present) or further additives (if present) is in the form of an aqueous solution, dispersion, suspension or emulsion, to form a homogenous aqueous blend, and then b) powderizing the aqueous blend to form one-pack polymer modifier particles. The optional mineral filler(s) and further additive(s) may be in dry form and/or in the form of an aqueous solution, dispersion, suspension or emulsion. In one embodiment, a mineral filler in dry particulate form may be admixed with the powder obtained by co-spray drying a homogenous aqueous blend of functionalized process aid and impact modifier to prepare the one-pack polymer modifier. In another embodiment, the optional mineral filler(s) may be added in dry form to a homogenous aqueous blend of one or more functionalized process aids (possibly also one or more non-functionalized process aids) and one or more impact modifiers and a coupling agent in a stirring vessel, the mixture is then powderized to form one-pack polymer modifier particles. In another embodiment, however, the following method may be practiced: a) blending one or more functionalized process aids (possibly also one or more non-functionalized process aids), one or more impact modifiers, and one or more mineral fillers (and optionally one or more further additives), wherein at least one of the functionalized process aids, impact modifiers, mineral fillers or further additives (if present) is in the form of an aqueous solution, dispersion, emulsion or suspension to form a homogeneous aqueous blend and b) powderizing the homogenous aqueous blend to form one-pack polymer modifier particles. This approach is capable of producing a one-pack modifier in which the mineral filler is in intimate contact with the process aid and impact modifier.

The aqueous solution, suspension, dispersion or slurry of the functionalized process aid or impact modifier may be an aqueous solution, suspension, dispersion or slurry of functionalized process aid or impact modifier with a solid content advantageously between 5 and 90% by weight, e.g., between 30 and 60% by weight. This aqueous solution, suspension, dispersion or slurry can contain any specific surfactant, dispersing agent, additive or surface treatment that can advantageously improve the quality of the aqueous solution, suspension, dispersion or slurry (stability, viscosity or compatibility with the host matrix). The aqueous solution, suspension, dispersion or slurry may contain one or more processing additives introduced during preparation of the aqueous solution, suspension, dispersion or slurry. According to certain embodiments of the invention, the one-pack polymer modifier is formed by co-powderizing an aqueous suspension, solution, or dispersion (latex) of the process aid, an aqueous solution, suspension, dispersion of the impact modifier and, optionally, an aqueous slurry of a mineral filler. The ratio of functionalized process aid to impact modifier (on a solids basis) is dependent on the final application, and if other components, such as a mineral filler, are also part of the composite modifier. The ratio of process aid to impact modifier may be from 99:1 to 1:99, e.g., from 75:1 to 1:50.

The blending and powderization can be done in several ways.

Powderization of the aqueous stream(s) can occur by any means known in the art, including but not limited to spray drying, drum drying, coagulation, freeze coagulation or freeze drying. Following a coagulation step, the one-pack polymer modifier may be filtered before drying.

In a first embodiment, an aqueous functionalized process aid component and an aqueous impact modifier component (optionally also an aqueous or dry mineral filler component) are blended to form a homogeneous aqueous blend. More than one process aid component, more than one impact modifier component and more than one optional aqueous mineral filler component can be blended together. A coupling agent can be added to help bind the mineral filler(s) to the process aid(s) and impact modifier(s) components. This blend is then powderized.

In a second embodiment, the aqueous process aid component and aqueous impact modifier component (and, if so desired, the optional aqueous mineral filler component) are introduced separately but simultaneously into the dryer and are blended together during the powderization process. Several different aqueous streams of process aids, impact modifiers and/or mineral fillers may be used. In the case of spray drying, this blending/powderization can be accomplished by the simultaneous introduction into the drying chamber of the separate aqueous streams through separate nozzles.

In a third embodiment, the aqueous functionalized process aid component is mixed with a dry powder impact modifier (possibly also at least one mineral filler, in dry or aqueous form) and blended to form a homogeneous aqueous blend. More than one process aid and more than one dry powder impact modifier can be blended together. A coupling agent can be added. This blend is then converted to a powder.

In a fourth embodiment, the functionalized process aid component in dry powder form is mixed with the impact modifier component in aqueous form (possibly also at least one mineral filler, in dry or aqueous form) and blended to form a homogeneous aqueous blend. More than one process aid and more than one impact modifier can be blended together. A coupling agent can be added. This blend is then converted to a powder.

A combination of the above-described processes is also contemplated by the invention, with some or all of each component being pre-blended or blended during the powderization process.

Other aqueous components can also be co-powderized with the process aid and impact modifier components in a similar manner. In one embodiment, an aqueous slurry of mineral filler(s) is added into the powderization process—either as an aqueous mixture of all three (process aid, mineral filler, and impact modifier) components, or separately introduced and blended at a point before final drying—such as through separate nozzles in a spray dryer.

Whatever the process used to form the one-pack polymer modifier, the final product when at least one mineral filler is used is considered as a composite one-pack polymer modifier being either a composite modifier when the original mineral filler part contains primary particles with sizes in the micrometer scale, or a nanocomposite modifier when the mineral filler part contains primary particles with sizes in the nanometer scale. The resulting powder material contains composite particles that contains both organic and inorganic phases, intimately mixed together.

Thermoplastic Polymers

The one-pack polymer modifiers of the present invention are useful as components of PVC compounds (resin formulations) comprising, consisting essentially of or consisting of at least one PVC polymer and a one-pack polymer modifier.

The PVC resin may be produced at a number of different molecular weights using any method known in the art, including, but not limited to solution, suspension, or emulsion polymerization. The PVC resin may include, but not be limited to, rigid PVC resins, flexible PVC resins, PVC plastisols, as well as mixtures or combinations formed with one or more other thermoplastic and/or thermoset resins. The PVC resin may be characterized by its molecular weight, which is commonly reported as inherent viscosity (IV) or K-value. In general, the higher the IV or K-value of the PVC resin, the greater the impact strength of the PVC or other thermoplastic resin component made therefrom. However, PVC resins having a high molecular weight are also more difficult to achieve fusion and polymer flow without the use of excessive heat or shear. The molecular weight of the PVC resin used in the formulation from which a PVC component is made can be predetermined based on the mechanical properties and economic factors desired for the final product. Typically, resins within the K-value range of about 56 to about 72; alternatively, about 63 to about 67; alternatively, about 65 are used for forming PVC components having a rigid profile with lower molecular weights being used for foam applications. The molecular weight of the PVC resin is generally less than the molecular weight of the process aids used therewith. The amount of the PVC resin used in the formulation to form the PVC or other thermoplastic resin component may range from about 30 wt. % to about 90 wt. % of the entire PVC formulation; alternatively, between about 50 wt. % to about 85 wt. %.

Other thermoplastic polymers such as, but not limited to, acrylic polymers, styrenic polymers, polycarbonates (PC), thermoplastic polyurethanes (PU), and polyvinylidine fluoride polymers (PVDF) can be combined with PVC to form PVC alloys are useful in the present invention, and further including the one-pack polymer modifiers of the invention to form a component with reduced surface gloss and improved impact properties.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoprene copolymers styrene-isoprene-styrene (SIS) block copolymers and their partially or fully hydrogenated derivatives, styrene-(meth)acrylate copolymers such as styrene-methyl methacrylate copolymers (S/MMA), and mixtures thereof. A preferred styrenic polymer is ASA. Styrenic copolymers useful in the invention may have, for example, a styrene monomer content of at least 10 percent by weight, preferably at least 25 percent by weight.

The styrenic polymers can also be blended with other polymers to form compatible blends. Examples include ASA blended with PVC, and SAN blended with PMMA.

Acrylic polymers, as used herein, include but are not limited to, homopolymers, copolymers and terpolymers comprising alkyl (meth)acrylates. The acrylic polymers can also be blended with other polymers to form compatible blends. Examples of such blends include PMMA blended with PVC, PMMA blended with ASA, and PVC blended with PLA (polylactic acid).

The alkyl methacrylate monomer is preferably methyl methacrylate, which may make up from 60 to 100 of the monomer mixture. 0 to 40 percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 percent of one or more $C_{1-4}$ acrylates.

The thermoplastic polymers of the invention can be manufactured by any means known in the art, including emulsion polymerization, solution polymerization, and suspension polymerization. In one embodiment, the thermoplastic matrix has a weight average molecular weight ($M_w$) of between 50,000 and 500,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

Especially preferred thermoplastic polymers for the matrix polymer are styrenic polymers (including SAN, ABS, MABS, ASA, HIPS), acrylic, and PVDF polymers.

Uses of One-Pack Polymer Modifiers

The one-pack polymer modifiers of the invention are used to modify the properties of PVC and PVC alloys during manufacturing. In particular, the one-pack polymer modifiers may be employed to modify the glossiness of surfaces of articles fabricated using PVC and PVC alloys as well as to modify the impact properties of such articles. Such one-pack polymer modifiers are convenient for the article manufacturer to use and may also, depending upon how the one-pack polymer modifier has been prepared, offer certain advantages and improvements in the properties of the articles as compared to comparable articles made from PVC polymer and alloys in which the functionalized process aid and impact modifier (and optional other components such as mineral filler) have been separately formulated into the PVC polymer rather than in the form of a one-pack system.

The following description is merely exemplary in nature and is in no way intended to limit the present disclosure or its application or uses. For example, the polyvinyl chloride (PVC) formulations made and used according to the teachings contained herein is described throughout the present disclosure in conjunction with "PVC" or "vinyl" windows and doors in order to more fully illustrate the composition and the use thereof. The incorporation and use of such a PVC formulation in other applications or products are contemplated to be within the scope of the present disclosure. Formulations made using other thermoplastic polymers/resins in other applications or products are also contemplated to be within the scope of the present disclosure. Such applications may include but not be limited to automotive products, building materials, household or kitchen items, medical or office supply products, apparel, or packaging for personal care or other consumer products. It should be understood that throughout the description, corresponding reference numerals indicate like or corresponding parts and features.

The present disclosure generally provides a polyvinyl chloride (PVC) or PVC alloy component that exhibits reduced surface gloss and improved impact resistance. More specifically, the PVC or PVC alloy component comprises, consists essentially of, or consists of a polyvinyl chloride (PVC) or PVC alloy resin and a one-pack polymer modifier comprising, consisting essentially of one or more process aids, wherein at least one of the process aids is functionalized with about 0.5 wt. % to about 35 wt. % of a reactive epoxy, hydroxyl, β-keto ester, β-keto amide or carboxylic acid functional group based on the total weight of the process aids, at least one impact modifier, optionally at least one mineral filler and optionally at least one further additive. The PVC component formed therefrom may exhibit a gloss reduction of at least 5 points measured at an angle of 85 degrees or less when compared to a similar PVC component in which the process aids (PA) are not functionalized. The functionalized process aid (f-PA), used with an impact modifier, surprisingly decreases the surface gloss and maintains the mechanical properties exhibited by the PVC or other thermoplastic resin component, which are beneficial for many applications where aesthetics are important. The mechanical properties that remain substantially unaffected or become enhanced upon the functionalization of the process aid with a reactive functional group include, without limitation, impact properties and density, as well as the parameters associated with the processability (e.g., extrusion) of the PVC or PVC alloy resin formulation.

According to one aspect of the present disclosure, the reduction in surface gloss exhibited by a PVC component comprising a one-pack polymer modifier containing a functionalized process aid (f-PA) as compared to a similar PVC component with conventional process aids (PA) may alternatively be characterized as at least 10 points measured at an angle of 60 degrees or less; alternatively, at least 15 points measured at an angle of 20 degrees. Alternatively, the change (Δ) in surface gloss between a PVC component with a f-PA as compared to a similar PVC component with a conventional PA is greater than about 5 points measured at any angle; alternatively greater than about 10 points measured at any angle; alternatively, greater than 20 points measured at 85°; alternatively, greater than 25 points measured at 60° or less; alternatively, greater than 30 points measured at 60° or less.

According to another aspect of the present disclosure, functionalized process aids that are synthesized for polyvinyl chloride processing and modified with functional groups as described above and further defined herein achieve differentiating effects in the polyvinyl chloride matrix as compared to conventional acrylic process aids. The functionalized process aids comprise acrylic polymers or copolymers synthesized with reactive epoxy, hydroxyl, β-keto ester, β-keto amide or carboxylic acid functional groups, which are capable of reacting during the process that is used to form the PVC component. An example of a method capable of forming the PVC component includes, without limitation, an extrusion process. During the extrusion process, the reactive functional groups facilitate the occurrence of crosslinking with or without the presence of an optional chain extender or crosslinking agent. When desirable, the crosslinking during extrusion may occur between particles that are formed by the process aids (e.g., crosslinking between process aid to process and/or crosslinking between process aid and PVC). Conventional process aids used in polyvinyl chloride (PVC) formulations are typically comprised of acrylate and methacrylate monomers, which are not reactive during such processing.

The amount of process aid(s) present in the PVC or PVC alloy formulation may range from about 0.1 phr to about 12 phr in PVC formulations; alternatively, from about 0.1 phr to about 7 phr in PVC formulations or PVC alloy; alternatively, greater than or equal to 1 phr. In the context of the present disclosure, the term "phr" means parts per hundred parts of PVC or PVC alloy polymer. The amount of the process aid(s) present in the PVC polymer or PVC alloy formulation may also be expressed as a weight percentage based on the total weight of the PVC or PVC alloy formulation. The use level of the process aid(s) in the PVC or PVC alloy formulation may vary depending on the type of PVC or PVC alloy formulation selected and the specification set forth for the application in which the PVC or PVC alloy component will be utilized. In other words, the amount of the process aid in the formulation may be predetermined based on the use level necessary to reduce surface gloss to a level that matches the color requirements for a given application (i.e., siding, window profile, pipe, or foamed sheet, among others).

The process aids may promote fusion of the PVC resin, and also may assist with enhancing mixing of the components thereby improving the strength of the melted polymer blend, and controlling the volume increase or swelling that occurs immediately after the melted polymer blend leaves the die opening (e.g., die swell), and reducing the occurrence of plate out and crystallinity, as well as improving long-term impact strength and weatherability. In general, a process aid with a higher molecular weight tends to lead to a higher level of die swell. A higher level of die swell may be beneficial when making a foamed PVC component.

In PVC alloys, the purpose of the functionalized process aid may reduce gloss.

The one-pack polymer modifier is formulated with a PVC alloy (which may, for example, be in powder, granule, or pellet form), and optionally other additives, by means known in the art—generally as a dry blend of components—and blended until a homogeneous compound is obtained. The blended compound of one-pack polymer modifier, PVC alloy and optionally one or more other additives may then be formed into objects by conventional melt processing techniques (e.g., injection molding, extrusion, calendaring, blow molding, foaming and thermoforming, etc.). The one-pack polymer modifier (e.g., in powder form) and PVC alloy, as a powder, granules or pellets, could also be added together into the extrusion equipment, however it is more difficult to obtain a homogeneous blend.

The amount of one-pack polymer modifier combined with PVC alloy may be varied as may be desired depending upon the composition of the one-pack polymer modifier, the type(s) of thermoplastic polymer and the levels of surface gloss reduction and impact property improvement sought to be achieved, among other factors. Typically usage levels are, for example, from 0.1 to 20 phr one-pack polymer modifier or from 1 to 10 phr one-pack polymer modifier.

Master batches or concentrates comprised of, consisting essentially of or consisting of at least one thermoplastic polymer and at least one one-pack polymer modifier are also contemplated by the present invention. In such master batches or concentrates, the amount of one-pack polymer modifier admixed with the thermoplastic polymer is higher than the desired concentration of one-pack polymer modifier in the final object or article to be prepared using the master batch or concentrate, wherein the master batch or concentrate is further combined with additional thermoplastic polymer in a ratio effective to achieve such desired concentration.

In the aspects of the invention wherein the one-pack polymer modifier contains a mineral filler in intimate contact with the functionalized process aid and impact modifier to form a composite one-pack polymer modifier, during the admixing each phase of the modifier (organic and inorganic) is individually dispersed down to their own original primary particle size into the host thermoplastic matrix. Due to the high compatibility of the composite one-pack polymer modifier with the host thermoplastic matrix, the mineral filler is able to better disperse into this matrix than it usually does when introduced directly as a separate powder.

The composite one-pack polymer modifiers according to certain aspects of the present invention provide several advantages, believed due to the fact that the resultant composite one-pack polymer modifier powder consists of complex particles that contain both polymer and inorganic filler phases, intimately mixed together. The intimate mixture reduces the separation of components during transport, provides increased flowability for the polymer particles, and aids in better dispersion of the mineral filler in the thermoplastic resulting in a more homogeneous modified thermoplastic when compared to the dispersion of the powder components added separately into the thermoplastic. Thus there is a clear synergy between the process aid, mineral filler, and impact modifier when prepared by the co-powderization process described in the present invention.

The process for preparing the composite one-pack polymer modifier can also be considered as a new way of introducing a mineral filler into a plastic matrix through its intimate combination with an organic process aid, allowing for good dispersion of both standard mineral fillers having surface treatments for compatibility with the host plastic matrix, as well as mineral fillers without any surface treatment. In other words, the polymeric process aid may act as a compatibilizer for the mineral filler with respect to the host polymer matrix.

The thermoplastic compound modified by the one-pack polymer modifiers of the invention, can be used to manufacture a variety of objects, including, but not limited to: construction products (siding, window profiles, flooring, fencing), pipe, foams, etc. One of skill in the art, based on the description and examples provided, can imagine a wide-range of uses for the composition of the invention.

Exemplary Aspects of the Invention

Particular exemplary aspects of the present invention may be summarized as follows:

Aspect 1: A one-pack polymer modifier for polyvinyl chloride and polyvinyl chloride alloys comprised of, consisting essentially of or consisting of:

a) at least one process aid, including at least one functionalized process aid functionalized with at least one reactive functional group selected from the group consisting of epoxy functional groups, hydroxyl functional groups, β-keto ester functional groups, β-keto amide functional groups and carboxylic acid functional groups; and
b) at least one impact modifier;
wherein the one-pack polymer modifier is in the form of a plurality of individual particles and at least a portion of the individual particles contain both the at least one process aid and the at least one impact modifier.

Aspect 2: The one-pack polymer modifier according to Aspect 1, wherein the at least one functionalized process aid is functionalized with about 0.5 wt. % to about 35 wt. % of the at least one functional group based on the total weight of the process aid(s).

Aspect 3: The one-pack polymer modifier according to Aspect 1, wherein the at least one functionalized process aid is functionalized with at least 1 wt. % of the at least one reactive functional group based on the total weight of the process aid(s).

Aspect 4: The one-pack polymer modifier according to any of Aspects 1-3, wherein the at least one reactive functional group is derived from one or more monomers selected from the group consisting of hydroxyl-substituted alkyl esters of (meth)acrylic acid; vinyl esters of linear or branched carboxylic acids; unsaturated $C_3$-$C_6$ monocarboxylic acids; unsaturated $C_4$-$C_6$ dicarboxylic acids; epoxy group-containing monomers; β-keto esters of (meth)acrylic acid; β-keto amides of (meth)acrylic acid, and mixtures thereof.

Aspect 5: The one-pack polymer modifier according to any of Aspects 1-4, wherein the at least one functionalized process aid comprises a co-polymer of at least one alkyl (meth)acrylate and at least one functionalized monomer selected from the group consisting of glycidyl (meth)acrylate and (meth)acrylic acid.

Aspect 6: The one-pack polymer modifier according to any of Aspects 1-5, wherein the at least one functionalized process aid has a weight average molecular weight ($M_w$) that is about 50,000 g/mol or higher.

Aspect 7: The one-pack polymer modifier according to any of Aspects 1-6, wherein the at least one functionalized process aid is derived from one or more (meth)acrylic-containing monomers and, optionally, one or more co-monomers selected from the group consisting of vinyl-containing monomers, styrene and styrene derivatives, olefins, dienes, and mixtures thereof.

Aspect 8: The one-pack polymer modifier according to any of Aspects 1-7, wherein at least one of the following conditions exists: a) at least one of the one or more functionalized process aids is crosslinked; or b) at least one of the functionalized process aids is capable of crosslinking with itself or a thermoplastic polymer.

Aspect 9: The one-pack polymer modifier according to any of Aspects 1-8, wherein the at least one impact modifier is selected from block copolymers, core-shell particulate polymers or mixtures thereof.

Aspect 10: The one-pack polymer modifier according to any of Aspects 1-9, wherein the at least one impact modifier is selected from core-shell particulate polymers having a rubbery core with a glass transition temperature less than 50 degrees C. and a grafted, compatible, outer polymeric shell.

Aspect 11: The one-pack polymer modifier according to Aspect 10, wherein the outer polymeric shell is comprised of polymethylmethacrylate.

Aspect 12: The one-pack polymer modifier according to any of Aspects 1-11, wherein the at least one impact modifier is a core-shell particulate polymer having a primary particle size of from 70 nm to 5 microns Aspect 13: The one-pack polymer modifier according to any of Aspects 1-12, comprising from 1 to 50 wt. % in total of the at least one process aid and from 99 to 50 wt. % in total of the at least one impact modifier, based on the total weight of process aid and impact modifier.

Aspect 14: The one-pack polymer modifier according to any of Aspects 1-13, further comprising at least one mineral filler.

Aspect 15: The one-pack polymer modifier according to Aspect 14, wherein the at least one process aid, the at least one impact modifier and the at least one mineral filler are in intimate contact.

Aspect 16: The one-pack polymer modifier according to Aspect 14 or 15, wherein the at least one mineral filler is selected from the group consisting of ground natural calcium carbonate (GCC), precipitated calcium carbonate (PCC), nanosized PCC (NPCC), fumed silica, precipitated silica, untreated clay, untreated Montmorillonite (nano-clay), zeolite, perlite and mixtures thereof.

Aspect 17: The one-pack polymer modifier according to any of Aspects 14-16, comprising from 1 to 50 wt. % in total of the at least one process aid, from 99 to 50 wt. % in total of the at least one impact modifier, and from 0.01 to 15 wt. % in total of the at least one mineral filler, based on the total weight of process aid, impact modifier and mineral filler.

Aspect 18: The one-pack polymer modifier according to any of Aspects 1-17, wherein the one-pack polymer modifier is formed by co-powderization of aqueous solutions, emulsions, suspensions or slurries of the at least one process aid and the at least one impact modifier.

Aspect 19: A method for making an article of manufacture selected from an automotive product, a building material, a household or kitchen item, a medical or office supply product, apparel, or packaging for personal care or other consumer products, comprising forming the article of manufacture from a PVC or PVC alloy compound and a one-pack polymer modifier according to any of Aspects 1-18

Aspect 20: A method of reducing surface gloss and increasing impact strength of a PVC or PVC alloy component, the method comprising preparing a PVC or PVC alloy compound by admixing at least the one-pack polymer modifier according to any of Aspects 1-18 and a PVC polymer or PVC ally and forming a PVC or PVC alloy component from the PVC or PVC alloy compound.

Aspect 21: A PVC or PVC alloy compound comprising, consisting essentially of or consisting of a PVC or PVC alloy matrix (e.g., a thermoplastic matrix comprised of polyvinylchloride) and a one-pack polymer modifier according to any of Aspects 1-18 (the thermoplastic compound may comprise 1 to 10 phr of the one-pack polymer modifier). The PVC or PVC alloy compound may further comprise one or more additives selected from the group consisting of surfactants, dispersing agents, fillers, heat stabilizers, internal and external lubricants, other process aids, melt strength additives, flow aids, process aids not part of the one-pack polymer modifier, impact modifiers not part of the one-pack polymer modifier and pigments.

Aspect 22: An article of manufacture selected from an automotive product, a building material, a household or kitchen item, a medical or office supply product, apparel, or packaging for personal care or other consumer products, wherein the article of manufacture is comprised of the PVC or PVC alloy compound according to Aspect 21.

EXAMPLES

Example 1—Sample Formulation and Test Protocols

Polymer processing may be done using a Brabender rheometer, which takes a blended PVC formulation (powder), including either control acrylic process aids or those functionalized with reactive species, and measures fusion torque, fusion time, fusion temperature and equilibrium torque. The methodology for measuring the fusion of PVC compounds using a torque rheometer is a standard practice performed according to ASTM D2538-02 (2010, ASTM International, West Conshohocken, PA).

Pellets made from the formulations and using pellet making techniques well known to those skilled in the art may then be used in injection molding equipment to prepare injection mold test bars and plaques. Either powder blended formulations or pellets made from the formulations may then be used in extrusion equipment to prepare extruded sheet or profile. After the bars, plaques, sheet, and profile were made, they may be tested for impact strength and gloss with a gloss meter to record the surface's ability of each sample to reflect light. Izod impact is defined as the kinetic energy needed to initiate fracture and to continue such fracture until the specimen is broken. Izod test specimens may be notched and measured according to the methodology defined in ASTM D256-10e1 (ASTM International, West Conshohocken, PA). The impact strength or toughness of a plastic may also be determined using a falling dart (i.e., Gardner Impact) methodology as defined according to ASTM D4226 and ASTM D5420 (ASTM International, West Conshohocken, PA).

Gloss is associated with the capacity of a surface to reflect more light in directions that are close to the specular. The specular gloss exhibited by bars, plaques, sheets and profile can be measured at various angles according to the standard test methodology described in ASTM D523 (2014, ASTM, International, West Conshohocken, PA). The measured gloss ratings may be obtained by comparing the specular reflectance of the test bars plaques, sheets or profiles to that of a black glass standard.

The amount of each process aid that forms a soluble fraction or remains as an insoluble fraction can be determined using extraction performed with a solvent, such as acetone, THF, or MEK. A predetermined total of powder is added to a flask along with about 35 grams of a solvent. The powder/solvent mixture is stirred or shaken for 22 hours upon which time another ~30 grams of solvent is added to the flask and then stirred or shaken for an additional 1.5 hours. Then about 30 grams of the mixture solution is placed into a centrifuge tube and subjected to a centrifugal force at 16,500 rpm for 3-5 hours at a temperature of 5° C. The top portion of the separated mixture solution is added to another tube and then centrifuged a second time under similar conditions. The clear supernatant present in the centrifuge tube is collected with 10 mL of this supernatant being placed into an aluminum pan using a serological pipette. The supernatant in the aluminum pan is dried upon exposure to heat and the percentage of the insoluble fraction can determined according to Equation 1, where $W_f$ is the final weight of the aluminum pan, $W_i$ is the initial weight of the aluminum pan, $W_{powder}$ is the weight of the predetermined amount of powder placed in the flask, $V_{solvent}$ is the total volume of solvent placed in the flask, and $V_{supernatant}$ is the volume of the supernatant pipetted into the aluminum pan.

$$\% \text{ Insoluble Fraction} = \left[1 - \frac{(W_f - W_i)}{W_{powder}} \times \frac{V_{solvent}}{V_{supernatant}}\right] \times 100 \quad \text{(Eq. 1)}$$

Example 2—Measurement of Molecular Weight of Process Aids

The molecular weight associated with the process aids may be determined using gel permeation chromatography (GPC) by various known methods and procedures. One such method utilizes a differential refractometer equipped with two PL gel mixed A columns and a guard column An injection volume of 150 microliters (μL) of the soluble portion of the process aids as a THF solution with a concentration of 1.5 mg/mL is injected into the column at a temperature of 35° C. The elution of the process aids through the column is performed using a flow rate of 1.0 mL/min of the THF solvent (HPLC grade). Each sample of the process aids may be tested in either a filtered or unfiltered state. The chromatograms for each tested sample are obtained and analyzed with the molar mass values being calculated relative to a poly(methyl methacrylate), PMMA, calibration curve. Further information regarding GPC methodology is found in ASTM D4001-13 (ASTM International, West Conshohocken, PA).

The molar mass averages of the filtered and unfiltered samples may slightly differ from one another. In other words, the filtering of a sample thru a 1.0 μm PTFE film may affect the measured molecular weight distribution. The filtering of a sample can remove the extremely high molar mass species thus decreasing the high end of the molar mass distribution. The filtering of a sample can also result in the degradation of the high molar mass species thus increasing the amount of lower molar mass species resulting in higher values for the number average and/or weight average molar mass averages. The molar mass averages are weighted averages based on the number of molecules at each slice thus increasing or decreasing the amount of molecules of a given molar mass can affect the molar mass averages and distribution.

A total of three injections for each sample is averaged to obtain the average molecular weight ($M_w$). The molecular weight of each different process aid sample is obtained unfiltered, as well as filtered. The average molecular weight ($M_w$) for the tested samples may range, for example, from 50,000 g/mol to about 15 million g/mol in both the unfiltered and filtered state. The polydispersity, which is defined as being the ratio of weight average to number average molecular weight ($M_w/M_n$), for each tested sample may be between about 10 to about 60.

Example 3—Measurement of Glass Transition Temperature for Process Aids

Differential Scanning calorimetry (DSC) is utilized to determine the glass transition temperature ($T_g$) of the process aids prepared according to the teachings of the present disclosure. Each DSC measurement is obtained over the temperature range of −75° C. to 160° C. using a heating rate of 20° C./minute and a cooling rate of 10° C./minute. The $T_g$ is determined as an average of at least two measurements obtained for each sample formulation. Further description of DSC methodology is found in ASTM E1356-08(2014) (ASTM International, West Conshohocken, PA).

The glass transition temperature ($T_g$) of the process aids can be determined either as a powder or as a bar formed from powder. The powder may be pressed into a bar upon being subjected to an elevated temperature (e.g., 215° C.) under high pressure (e.g., 25 tons). A total of 10 different process aid samples were analyzed with the average $T_g$ for each sample being within the range of 0° C. to about 150° C. No significant difference in the glass transition temperature measured for the bars and the powders was observed. For example, one specific process aid sample exhibited a glass transition temperature of 85.0° C. in bar form and 83.4° C. in powder form.

Example 4—Measurement of Relative Weight Percent Composition of Process Aids

Nuclear magnetic resonance (NMR) spectroscopy is utilized to determine the relative weight percent composition of the process aids by comparison of the signal integration values from the $^1$H NMR spectra. Soluble materials (5-10 mg) were dissolved in deuterated chloroform (~1 ml). Spectra of soluble materials were obtained using a Bruker 500 MHz (11.7 T) Ultrashield spectrometer at 25° C., an excitation pulse width of 14.75 μs, and a recycle delay of 5 seconds. Insoluble materials in powder form (40-70 mg) were swelled in deuterated chloroform (~1 ml). The resulting gel was transferred to a Kel-F insert with plug and sealing screw, which was then packed into a 4 mm MAS rotor. Spectra for the insoluble materials were obtained using a Bruker 300 MHz (7.0 T) wide-bore spectrometer at room temperature, an excitation pulse width of 3.75 μs, and a recycle delay of 5 seconds.

Example 5— Preparation of Process Aids Functionalized with Acrylic Acid (AA) or Glycidyl Methacrylate (GMA)

f-PA with GMA functionalization—A 5 liter polymerization heating mantle reactor equipped with a stirrer and a reflux condenser was charged with 848.7 g of distilled water, 31.34 g of sodium dodecylbenzene sulfonate, and 0.48 g of sodium carbonate. A monomer mixture of 320.0 grams of methyl methacrylate (MMA), 100.0 grams of butyl acrylate (BA), and 80.0 grams of glycidyl methacrylate (GMA) having a MMA/BA/GMA weight percent ratio of 64/20/16 was prepared and then added to the reactor. The reaction temperature was set to 45° C. while the reactor was sparged with nitrogen for 20 minutes. The reaction was initiated with the addition of 20.45 g 4% potassium persulfate solution in distilled water and 12.12 g 5% sodium metabisulfite solution in distilled water under the nitrogen atmosphere. A peak temperature of 86° C. was observed after 12 minutes. The reactor temperature was set to 80° C. and 1.25 g 4% potassium persulfate solution in distilled water were added to the reactor. The batch was held for 30 minutes at 80° C. and then cooled to the room temperature. The average latex particle size Dv was measured to be about 100 nm using a Nicomp Modle 380 ZLS. The solid content was ~36%.

f-PA with AA functionalization—The same procedure as described above for the GMA functionalization of the process aid was followed to make a process aid functionalizaed with acrylic acid (AA) with the exception of substituting the GMA co-monomer with acrylic acid. Thus the monomer mixture utilized comprised 324.6 grams of methyl methacrylate (MMA), 100.0 grams of butyl acrylate (BA), 75.0 grams of acrylic acid (AA), and 0.375 grams tert-dodecyl mercaptan (t-DDM) having a MMA/BA/AA/t-DDM weight percent ratio of 64.925/20/15/0.075. A peak temperature of 79.5° C. was observed 18 minutes after the addition of the initiators. The average latex particle size was measured to be about 165 nm. The solid content was ~35.7%.

Example 6—Preparation of Acrylic Impact Modifier Core-Shell Latex

A 5 l round bottom flask was fitted with a stirrer, temperature controller, nitrogen line and condenser. 1207 g deionized water, 4.85 g sodium hydrogenphosphate, and 40 g of a rubber seed latex were charged into the flask. The temperature of the flask was then raised to 80 degrees C., while keeping the stirring speed at 200 rpm. A mixture of 1335 g butyl acrylate, 10 g crosslinking agent, for example allyl methacrylate, butanediol diacrylate, diallyl maleate, 50 g sodium lauryl sulfate (30 wt. % in water) and 530 g deionized water in pre-emulsion form were slowly added into the reactor over 240 minutes. At the same time, 96 g 4.2% potassium persulfate solution in water was fed into the reactor separately over the same period. After the feeding was completed, the mixture was kept at 80 degrees C. for 60 minutes. 225 g methyl methacrylate was slowly added into the reactor over 90 minutes. 27 g 4.2% potassium persulfate solution in water was fed into the reactor separately over the same period. After the feeding was completed, the mixture was kept at 80 degrees C. for 60 minutes. Then 9 g 1% t-butylperoxide solution in water and 3 g 5% sodium formaldehyde sulfoxylate solution in water were added in the reactor. The reaction was then allowed to continue for one more hour, after which it was allowed to cool to ambient temperature. The final conversion of the reaction is higher than 99%.

Example 7: Preparation of an Acrylic Process Aid Latex

A 5 liter polymerization heating mantle reactor equipped with a stirrer and a reflux condenser was charged with 848.7 g of distilled water, 31.34 g of sodium lauryl sulfate, and 0.48 g of sodium carbonate. A monomer mixture of 400.0 grams of methyl methacrylate (MMA) and 100.0 grams of butyl acrylate (BA) having a MMA/BA weight percent ratio of 80/20 was prepared and then added to the reactor. The reaction temperature was set to 45° C. while the reactor was sparged with nitrogen for 20 minutes. The reaction was initiated with the addition of 20.45 g 4% potassium persulfate solution in distilled water and 12.12 g 5% sodium metabisulfite solution in distilled water under the nitrogen atmosphere. A peak temperature of 86° C. was observed after 12 minutes. The reactor temperature was set to 80° C. and 1.25 g 4% potassium persulfate solution in distilled water were added to the reactor. The batch was held for 30 minutes at 80° C. and then cooled to the room temperature. The average latex particle size Dv was measured to be about 100 nm using a Nicomp Modle 380 ZLS. The solid content was ~36%.

Prophetic Example 1: Preparation of One-Pack Polymer Modifier with Core-Shell Impact Modifier and Functionalized-Process Aid A one-pack polymer modifier for PVC will be prepared for the processing of rigid PVC building products. A core-shell impact modifier latex prepared as described in example 6 is blended with a functionalized process aid latex as described in example 5. The exact composition of the core-shell impact modifier and the functionalized process aid are listed in Table 1. In order to prepare the latex blend, both latexes mentioned will be poured into a large flask at a specified ratio (this ratio is also listed in Table 1) and agitated with a mixing propeller to fully disperse the latexes homogeneously. After adequate mixing, the latex blend will be placed in a spray dryer. The spray drying will atomize the fully blended latex into a final powder with moisture content <2 wt % of water.

ometer equipped with a small-scale conical, twin screw extruder. The PVC formulations will be extruded using the small-scale extruder and a 6-inch wide sheet die resulting in PVC sheet with a nominal thickness of 40 mils. Following the extrusion of the 40 mil PVC sheet samples using each of the one-pack polymer modifiers in Table 1, gloss values at 75° and Gardner drop-dart impact strength (ASTM D4226) using a ½-inch, hemispherical tup (Procedure A) will be measured. Drop-dart impact strength is measured as mean

TABLE 1

Core-shell modifier and functionalized process aid blends

| Blend | Core-shell component | Functionalized process aid | Ratio Core-shell impact modifier:functionalized process aid | Predicted Gloss (75 °) | Predicted MFE (in-lb) |
|---|---|---|---|---|---|
| 1 | 90 wt % rubber/ 10 wt % shell | 8 wt % GMA)/92 wt % MMA | 92:8 | 85 | 110 ± 10 |
| 2 | 90 wt % rubber/ 10 wt % shell | 8 wt % GMA)/92 wt % MMA] | 85:15 | 80 | 110 ± 10 |
| 3 | 90 wt % rubber/ 10 wt % shell | 8 wt % GMA)/92 wt % MMA | 72:25 | 75 | 110 ± 10 |
| 4 | 90 wt % rubber/ 10 wt % shell | 8 wt % GMA)/92 wt % MMA | 25:75 | 30 | 60 ± 10 |
| 5 | 85 wt % rubber/ 15 wt % shell | 8 wt % GMA)/92 wt % MMA | 92:8 | 88 | 110 ± 10 |
| 6 | 85 wt % rubber/ 15 wt % shell | 8 wt % GMA)/92 wt % MMA | 85:15 | 83 | 110 ± 10 |
| 7 | 85 wt % rubber/ 15 wt % shell | 8 wt % GMA)/92 wt % MMA | 72:25 | 78 | 110 ± 10 |
| 8 | 85 wt % rubber/ 15 wt % shell | 8 wt % GMA)/92 wt % MMA | 25:75 | 33 | 110 ± 10 |
| 9 | 70 wt % rubber/ 30 wt % shell | 8 wt % GMA)/92 wt % MMA | 92:8 | 93 | 100 ± 10 |
| 10 | 70 wt % rubber/ 30 wt % shell | 8 wt % GMA)/92 wt % MMA | 85:15 | 88 | 100 ± 10 |
| 11 | 70 wt % rubber/ 30 wt % shell | 8 wt % GMA)/92 wt % MMA | 72:25 | 83 | 100 ± 10 |
| 12 | 70 wt % rubber/ 30 wt % shell | 8 wt % GMA)/92 wt % MMA | 25:75 | 38 | 60 ± 10 |
| 13 | 90 wt % rubber/ 10 wt % shell | 16 wt % GMA)/84 wt % MMA | 92:8 | 80 | 110 ± 10 |
| 14 | 90 wt % rubber/ 10 wt % shell | 16 wt % GMA)/84 wt % MMA | 85:15 | 75 | 110 ± 10 |
| 15 | 90 wt % rubber/ 10 wt % shell | 16 wt % GMA)/84 wt % MMA | 72:25 | 70 | 110 ± 10 |
| 16 | 90 wt % rubber/ 10 wt % shell | 16 wt % GMA)/84 wt % MMA | 25:75 | 20 | 60 ± 10 |

Following the preparation of one-pack polymer modifiers, PVC formulations will be prepared for applications testing. A master batch of a 2,526.0 grams (126.3 phr) of a polyvinyl chloride (PVC) formulation will be prepared comprising 2,000 grams (100 phr) of a PVC resin (SE-950, Shintech Inc., Houston, TX), 20.0 grams (1.0 phr) of a tin stabilizer (Thermolite® 161, PMC Group Inc., Mount Laurel, NJ), 24.0 grams (1.2 phr) of calcium stearate, 20.0 grams (0.1 phr) of a lubricant (Rheolub® RL-165 Honeywell International Inc., NJ), 2.0 grams (0.1 phr) of a secondary polyethylene lubricant (AC629A, Honeywell International Inc., NJ), 100.0 grams (5.0 phr) of calcium carbonate, and 200.0 grams (10.0 phr) of titanium dioxide. This PVC master batch is then utilized to prepare various PVC formulations (Blends 1-16) containing various combinations of the one-pack polymer modifier prepared from the functionalized process aid in Example 5 and an acrylic impact modifier, such as the one prepared in Example 6. Using the PVC master batch described in this example, the one-pack polymer modifiers described in Table 1 will be added at 5.0 phr (or 125 g) and physically blended into the master batch.

The PVC formulations containing the one-pack modifiers will then be evaluated using a Brabender Intellitorque rheometer failure energy (MFE) and has the units of inch-pounds. The predicted values for gloss measurements and MFE are shown in Table 1.

Prophetic Example 2: Preparation of One-Pack Polymer Modifier with Core-Shell Impact Modifier, Functionalized Process Aid and Process Aid A one-pack polymer modifier for PVC will be prepared for the processing of rigid PVC building products. A core-shell impact modifier latex prepared as described in example 6 is blended with a functionalized process aid latex as described in example 5 and a process aid latex as described in example 7. The exact composition of the core-shell impact modifier and the functionalized process aid and acrylic process aid are listed in Table 2. In order to prepare the latex blend, all latexes mentioned will be poured into a large flask at a specified ratio (this ratio is also listed in Table 2) and agitated with a mixing propeller to fully disperse the latexes homogeneously. After adequate mixing, the late blend will be placed in a spray dryer. The spray drying will atomize the fully blended latex into a final powder with moisture content <2 wt % of water.

TABLE 2

Core-shell modifier, functionalized process aid, process aid blends

| Blend | Core-shell component | Functionalized Process Aid | Process Aid | Ratio core-shell impact modifier:functionalized process aid: non-funcationalized process aid | Predicted Gloss (75°) | Predicted MFE (in-lb) |
|---|---|---|---|---|---|---|
| 17 | 85 wt % rubber/15 wt % shell | 8 wt % GMA)/92 wt % MMA | Process Aid | 87:8:5 | 90 | 105 ± 10 |
| 18 | 85 wt % rubber/15 wt % shell | 8 wt % GMA)/92 wt % MMA | Process Aid | 83:12:5 | 85 | 105 ± 10 |
| 19 | 85 wt % rubber/15 wt % shell | 8 wt % GMA)/92 wt % MMA | Process Aid | 75:20:5 | 80 | 105 ± 10 |
| 20 | 85 wt % rubber/15 wt % shell | 8 wt % GMA)/92 wt % MMA | Process Aid | 25:70:5 | 45 | 60 ± 10 |

Following the preparation of one-pack polymer modifiers, PVC formulations will be prepared for applications testing. A master batch of a 2,526.0 grams (126.3 phr) of a polyvinyl chloride (PVC) formulation will be prepared comprising 2,000 grams (100 phr) of a PVC resin (SE-950, Shintech Inc., Houston, TX), 20.0 grams (1.0 phr) of a tin stabilizer (Thermolite® 161, PMC Group Inc., Mount Laurel, NJ), 24.0 grams (1.2 phr) of calcium stearate, 20.0 grams (0.1 phr) of a lubricant (Rheolub® RL-165 Honeywell International Inc., NJ), 2.0 grams (0.1 phr) of a secondary polyethylene lubricant (AC629A, Honeywell International Inc., NJ), 100.0 grams (5.0 phr) of calcium carbonate, and 200.0 grams (10.0 phr) of titanium dioxide. This PVC master batch is then utilized to prepare various PVC formulations (Blends 17-20) containing various combinations of the one-pack polymer modifier prepared from the functionalized process aid in Example 5, an process aid, such as the one prepared in Example 7, and an acrylic impact modifier, such as the one prepared in Example 6. Using the PVC master batch described in this example, the one-pack polymer modifiers described in Table 2 will be added at 5.0 phr (or 125 g) and physically blended into the master batch.

The PVC formulations containing the one-pack modifiers will then be evaluated using a Brabender Intellitorque rheometer equipped with a small-scale conical, twin screw extruder. The PVC formulations will be extruded using the small-scale extruder and a 6-inch wide sheet die resulting in PVC sheet with a nominal thickness of 40 mils. Following the extrusion of the 40 mil PVC sheet samples using each of the one-pack polymer modifiers in Table 2, gloss values at 75° and Gardner drop-dart impact strength (ASTM D4226) using a ½-inch, hemispherical tup (Procedure A) will be measured. Drop-dart impact strength is measured as mean failure energy (MFE) and has the units of inch-pounds. The predicted values for gloss measurements and MFE are shown in Table 2.

Prophetic Example 3: Preparation of One-Pack Polymer Modifier with Core-Shell Impact Modifier, Functionalized Process Aid and Mineral Filler A one-pack polymer modifier for PVC will be prepared for the processing of rigid PVC building products. A core-shell impact modifier latex prepared as described in example 6 is blended with a functionalized process aid latex as described in example 5 and a mineral filler slurry, such as ground calcium carbonate with a mean particle size of approximately 1 micron. The exact composition of the core-shell impact modifier and the functionalized process aid and mineral filler slurry are listed in Table 3. In order to prepare the latex blend, both latexes and slurry mentioned will be poured into a large flask at a specified ratio (this ratio is also listed in Table 3) and agitated with a mixing propeller to fully disperse the latexes homogeneously. After adequate mixing, the late blend will be placed in a spray dryer. The spray drying will atomize the fully blended latex and slurry into a final powder with moisture content <2 wt % of water.

TABLE 3

Core-shell modifier, functionalized co-polymer, and mineral filler blends

| Blend | Core-shell component | Functionalized Process Aid | Mineral filler | Ratio core-shell impact modifier:functionalized process aid:mineral filler | Predicted Gloss (75°) | Predicted MFE (in-lb) |
|---|---|---|---|---|---|---|
| 21 | 90 wt % rubber/10 wt % shell | 16 wt % GMA/ 84 wt % MMA | 75% GCC slurry | 65:5:30 | 80 | 90 ± 10 |
| 22 | 90 wt % rubber/10 wt % shell | 16 wt % GMA/84 wt % MMA | 75% GCC slurry | 60:10:30 | 75 | 90 ± 10 |
| 23 | 90 wt % rubber/10 wt % shell | 16 wt% GMA/84 wt % MMA | 75% GCC slurry | 55:15:30 | 70 | 90 ± 10 |

TABLE 3-continued

Core-shell modifier, functionalized co-polymer, and mineral filler blends

| Blend | Core-shell component | Functionalized Process Aid | Mineral filler | Ratio core-shell impact modifier:functionalized process aid:mineral filler | Predicted Gloss (75°) | Predicted MFE (in-lb) |
|---|---|---|---|---|---|---|
| 24 | 90 wt % rubber/10 wt % shell | 16 wt % GMA/ 84 wt % MMA | 75% GCC slurry [30 wt. %] | 35:35:30 | 25 | 45 ±10 |

Following the preparation of one-pack polymer modifiers, PVC formulations will be prepared for applications testing. A master batch of a 2,526.0 grams (126.3 phr) of a polyvinyl chloride (PVC) formulation will be prepared comprising 2,000 grams (100 phr) of a PVC resin (SE-950, Shintech Inc., Houston, TX), 20.0 grams (1.0 phr) of a tin stabilizer (Thermolite® 161, PMC Group Inc., Mount Laurel, NJ), 24.0 grams (1.2 phr) of calcium stearate, 20.0 grams (0.1 phr) of a lubricant (Rheolub® RL-165 Honeywell International Inc., NJ), 2.0 grams (0.1 phr) of a secondary polyethylene lubricant (AC629A, Honeywell International Inc., NJ), 100.0 grams (5.0 phr) of calcium carbonate, and 200.0 grams (10.0 phr) of titanium dioxide. This PVC master batch is then utilized to prepare various PVC formulations (Blends 21-24) containing various combinations of the one-pack polymer modifier prepared from the functionalized process aid in Example 5, an acrylic impact modifier, such as the one prepared in Example 6, and a mineral filler slurry, such as ground calcium carbonate. Using the PVC master batch described in this example, the one-pack polymer modifiers described in Table 3 will be added at 5.0 phr (or 125 g) and physically blended into the master batch.

The PVC formulations containing the one-pack modifiers will then be evaluated using a Brabender Intellitorque rheometer equipped with a small-scale conical, twin screw extruder. The PVC formulations will be extruded using the small-scale extruder and a 6-inch wide sheet die resulting in PVC sheet with a nominal thickness of 40 mils. Following the extrusion of the 40 mil PVC sheet samples using each of the one-pack polymer modifiers in Table 3, gloss values at 75° and Gardner drop-dart impact strength (ASTM D4226) using a ½-inch, hemispherical tup (Procedure A) will be measured. Drop-dart impact strength is measured as mean failure energy (MFE) and has the units of inch-pounds. The predicted values for gloss measurements and MFE are shown in Table 3.

Prophetic Example 4: Comparison of a One-Pack Polymer Modifier with Core-Shell Impact Modifier and Functionalized Co-Polymer and a One-Pack Polymer Modifier with a Core-Shell Impact Modifier and Non-Functionalized Process Aid The one-pack polymer modifier prepared in Prophetic Example 1, and more specifically, Blend 2 in Table 1 will be compared to a one-pack polymer modifier comprised of a core-shell impact modifier [90 wt. % rubber] and a non-functionalized acrylic process aid, such as the process aid prepared in Example 7. The ratio of this one-pack polymer modifier will be the same as that of Blend 2 in Table 1, i.e. 85 wt. % core-shell impact modifier and 15 wt. % non-functionalized acrylic process aid. Table 4 shows the blends and comparisons for the one-pack polymer modifiers to be compared.

TABLE 4

Comparative polymer one-pack modifier composition and predicted performance

| Blend | Core-shell component | Functionalized Process Aid | Process Aid | Ratio core shell impact modifier:functionalized process aid: non-functionalized process aid | Predicted Gloss (75°) | Predicted MFE (in-lb) |
|---|---|---|---|---|---|---|
| 2 | 90 wt % rubber/10 wt % shell | 8 wt % GMA/92 wt % MMA | — | 85:15:0 | 80 | 110 ± 10 |
| 25 | 90 wt % rubber/10 wt % shell | — | Process aid | 85:0:15 | 95 | 110 ± 10 |

Following the preparation of one-pack polymer modifiers, PVC formulations will be prepared for applications testing. A master batch of a 2,526.0 grams (126.3 phr) of a polyvinyl chloride (PVC) formulation will be prepared comprising 2,000 grams (100 phr) of a PVC resin (SE-950, Shintech Inc., Houston, TX), 20.0 grams (1.0 phr) of a tin stabilizer (Thermolite® 161, PMC Group Inc., Mount Laurel, NJ), 24.0 grams (1.2 phr) of calcium stearate, 20.0 grams (0.1 phr) of a lubricant (Rheolub® RL-165 Honeywell International Inc., NJ), 2.0 grams (0.1 phr) of a secondary polyethylene lubricant (AC629A, Honeywell International Inc., NJ), 100.0 grams (5.0 phr) of calcium carbonate, and 200.0 grams (10.0 phr) of titanium dioxide. This PVC master batch is then utilized to prepare various PVC formulations (Blends 2 and 25) containing various combinations of the one-pack polymer modifier prepared from the functionalized process aid in Example 5, an acrylic impact modifier, such as the one prepared in Example 6. The non-functionalized one-pack polymer modifier will use an acrylic impact modifier, such as the one prepared in Example 6 and a non-functionalized process aid, such as the one prepared in Example 7. Using the PVC master batch described in this example, the one-pack polymer modifiers described in Table 4 will be added at 5.0 phr (or 125 g) and physically blended into the master batch.

The PVC formulations containing the one-pack modifiers will then be evaluated using a Brabender Intellitorque rheometer equipped with a small-scale conical, twin screw extruder. The PVC formulations will be extruded using the small-scale extruder and a 6-inch wide sheet die resulting in PVC sheet with a nominal thickness of 40 mils. Following the extrusion of the 40 mil PVC sheet samples using each of the one-pack polymer modifiers in Table 4, gloss values at 75° and Gardner drop-dart impact strength (ASTM D4226) using a ½-inch, hemispherical tup (Procedure A) will be measured. Drop-dart impact strength is measured as mean failure energy (MFE) and has the units of inch-pounds. The predicted values for gloss measurements and MFE are shown in Table 4.

Prophetic Example 5: One-Pack Polymer Modifier with Core-Shell Impact Modifier and Functionalized Process Aid Used to Modify a PVC-Acrylic Alloy Blend The one-pack polymer modifier prepared in Prophetic Example 1, and more specifically, Blend 2 in Table 1 will be used in a PVC/polymethyl methacrylate (pMMA) alloy to modify surface gloss.

Following the preparation of one-pack polymer modifier, a PVC/acrylic alloy formulation will be prepared for applications testing. A master batch of a 2,997.5 grams (119.9 phr) of a polyvinyl chloride (PVC)/acrylic alloy formulation will be prepared comprising 1,250 grams (50 phr) of a PVC resin (SE-950, Shintech Inc., Houston, TX), 1,250 grams (50 phr) of acrylic resin (Solarkote® PB, Arkema Inc. King of Prussia, PA), 25.0 grams (1.0 phr) of a tin stabilizer (Thermolite® 161, PMC Group Inc., Mount Laurel, NJ), 20.0 grams (0.8 phr) of calcium stearate, 25.0 grams (1.0 phr) of a lubricant (Rheolub® RL-165 Honeywell International Inc., NJ), 10.0 grams (0.1 phr) of a secondary polyethylene lubricant (AC629A, Honeywell International Inc., NJ), and 250.0 grams (10.0 phr) of titanium dioxide. This PVC master batch is then utilized to prepare various PVC formulations (Blend 2) containing the one-pack polymer modifier prepared from the functionalized process aid in Example 5, an acrylic impact modifier, such as the one prepared in Example 6. Using the PVC/acrylic alloy master batch described in this example, the one-pack polymer modifier described in Table 5 will be added at 6.0 phr (or 150 g) and physically blended into the master batch.

The PVC/acrylic alloy formulation containing the one-pack modifier will then be evaluated using a Brabender Intellitorque rheometer equipped with a small-scale conical, twin screw extruder. The formulation will be extruded using the small-scale extruder and a 6-inch wide sheet die resulting in PVC sheet with a nominal thickness of 40 mils. Following the extrusion of the 40 mil PVC sheet samples using the one-pack polymer modifier in Table 5, gloss values at 60° and Gardner drop-dart impact strength (ASTM D4226) using a ½-inch, hemispherical tup (Procedure A) will be measured. Drop-dart impact strength is measured as mean failure energy (MFE) and has the units of inch-pounds. The predicted values for gloss measurements and MFE are shown in Table 5.

Within this specification, embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

TABLE 5

Polymer one-pack modifier performance in PVC/acrylic alloy

| Blend | Core-shell component | Functionalized Process Aid | Ratio Core-shell impact modifier:funcationalized process aid | Predicted Gloss (60 °) | Predicted MFE (in-lb) |
|---|---|---|---|---|---|
| 2 | 90 wt % rubber/ 10 wt % shell | 8 wt % GMA/92 wt % MMA | 85:15 | 80 | 50 ± 10 |

What is claimed is:

1. Polyvinyl chloride or polyvinyl chloride alloys, wherein said polyvinyl chloride (PVC) or said polyvinyl chloride (PVC) alloys comprises a one-pack polymer modifier in an amount of from about 0.1 to 10 per hundred parts of said PVC or PVC alloys, said one-pack polymer modifier comprises:
   a) at least one process aid, the at least one process aid including at least one functionalized polymer process aid having a weight average molecular weight ($M_w$) that is about 50,000 g/mol or higher, wherein the at least one functionalized polymer process aid includes soluble and insoluble fractions such that the functionalized polymer process aid exhibits partial insolubility in acetone, and which is functionalized with about 0.5 wt. % to about 35 wt. % (based on the total weight of weight of the process aid) of at least one reactive functional group selected from the group consisting of epoxy functional groups, hydroxyl functional groups, ß-keto ester functional groups, β-keto amide functional groups and carboxylic acid functional groups; and
   b) at least one impact modifier, wherein the at least one impact modifier is selected from block copolymers and core-shell particulate polymers, wherein the one-pack polymer modifier is in the form of a plurality of individual particles and at least a portion of the individual particles contain both the at least one process aid and the at least one impact modifier, and whereby the one-pack polymer modifier achieves gloss reduction in extruded polyvinyl chloride and polyvinyl chloride alloys without the presence of crosslinking agent.

2. The polyvinyl chloride or polyvinyl chloride alloys according to claim 1, wherein the at least one functionalized process aid is functionalized with at least 1 wt. % of the at least one reactive functional group based on the total weight of the process aid(s).

3. The polyvinyl chloride or polyvinyl chloride alloys according to claim 1, wherein the at least one reactive functional group is derived from one or more monomers selected from the group consisting of hydroxyl-substituted alkyl esters of (meth)acrylic acid; vinyl esters of linear or branched carboxylic acids; unsaturated $C_3$-$C_6$ monocarboxylic acids; unsaturated $C_4$-$C_6$ dicarboxylic acids; epoxy group-containing monomers; β-keto esters of (meth)acrylic acid; and β-keto amides of (meth)acrylic acid.

4. The polyvinyl chloride or polyvinyl chloride alloys according to claim 1, wherein the at least one functionalized process aid comprises a co-polymer of at least one alkyl (meth)acrylate and at least one functionalized monomer selected from the group consisting of glycidyl (meth)acrylate and (meth)acrylic acid.

5. The polyvinyl chloride or polyvinyl chloride alloys according to claim 1, wherein the at least one functionalized process aid is derived from one or more (meth)acrylic-containing monomers and, optionally, one or more co-monomers selected from the group consisting of vinyl-containing monomers, styrene and styrene derivatives, olefins, and dienes.

6. The polyvinyl chloride or polyvinyl chloride alloys according to claim 1, wherein at least one of the following conditions exists: a) at least one of the one or more functionalized process aids is crosslinked; or b) at least one of the functionalized process aids is capable of crosslinking with itself or a thermoplastic polymer.

7. The polyvinyl chloride or polyvinyl chloride alloys according to claim 1, wherein the at least one impact modifier is selected from core-shell particulate polymers having a rubbery core with a glass transition temperature less than 50° C. and a grafted outer polymeric shell.

8. The polyvinyl chloride or polyvinyl chloride alloys according to claim 7, wherein the outer polymeric shell comprises polymethylmethacrylate.

9. The polyvinyl chloride or polyvinyl chloride alloys according to claim 1, wherein the at least one impact modifier is a core-shell particulate polymer having a particle size of from 70 nm to 5 microns.

10. The polyvinyl chloride or polyvinyl chloride alloys according to claim 1, wherein said one-pack polymer modifier comprises from 1 to 50 wt. % in total of the at least one process aid and from 99 to 50 wt. % in total of the at least one impact modifier, based on the total weight of process aid and impact modifier.

11. The polyvinyl chloride or polyvinyl chloride alloys according to claim 1, wherein said one-pack polymer modifier further comprises at least one mineral filler.

12. The polyvinyl chloride or polyvinyl chloride alloys according to claim 1, wherein the at least one process aid, the at least one impact modifier and at least one mineral filler are in intimate contact in said one-pack polymer modifier prior to combination with said polyvinyl chloride or PVC alloy.

13. The polyvinyl chloride or polyvinyl chloride alloys according to claim 11, wherein the at least one mineral filler is selected from the group consisting of ground natural calcium carbonate (GCC), precipitated calcium carbonate (PCC), nanosized PCC (NPCC), fumed silica, precipitated silica, untreated clay, untreated Montmorillonite (nanoclay), zeolite, and perlite.

14. The polyvinyl chloride or polyvinyl chloride alloys according to claim 1, wherein the one-pack polymer modifier comprises from 1 to 50 wt. % in total of the at least one process aid, from 99 to 50 wt. % in total of the at least one impact modifier, and from 0.01 to 15 wt. % in total of at least one mineral filler, based on the total weight of process aid, impact modifier and mineral filler.

15. The polyvinyl chloride or polyvinyl chloride alloys according to claim 1, wherein the one-pack polymer modifier is formed by co-powderization of aqueous solutions, emulsions, suspensions or slurries of the at least one process aid and the at least one impact modifier.

16. The polyvinyl chloride or polyvinyl chloride alloys according to claim 1, further comprising one or more additives selected from the group consisting of surfactants, dispersing agents, fillers, heat stabilizers, internal and external lubricants, other process aids, melt strength additives, flow aids, process aids not part of the one-pack polymer modifier, impact modifiers not part of the one-pack polymer modifier and pigments.

17. A thermoplastic compound comprising the polyvinyl chloride or polyvinyl chloride alloys and one pack polymer modifier of claim 1.

18. A thermoplastic component comprising the polyvinyl chloride or polyvinyl alloys and the one-pack polymer modifier of claim 1.

19. The polyvinyl chloride or polyvinyl chloride alloys according to claim 1 wherein the insoluble fraction ranges from 1 to 99% in acetone.

* * * * *